No. 616,795. Patented Dec. 27, 1898.
W. C. MEYER.
CORN PLANTER ATTACHMENT.
(Application filed Oct. 6, 1898.)
(No Model.)
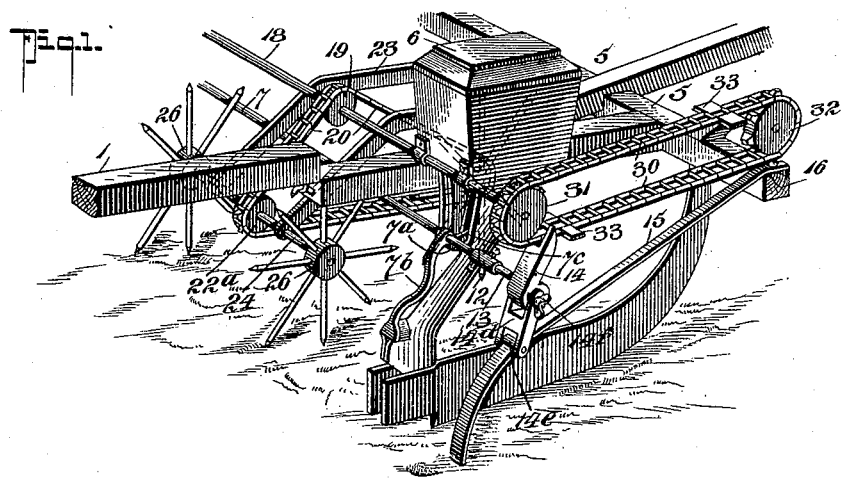
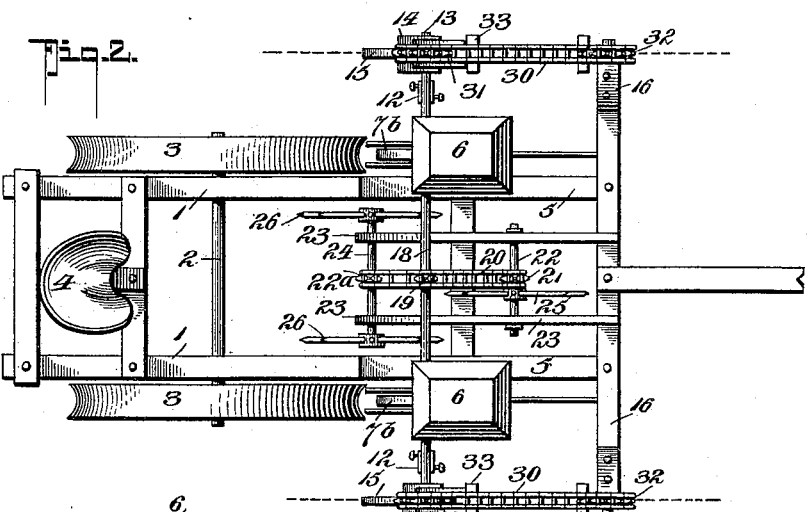
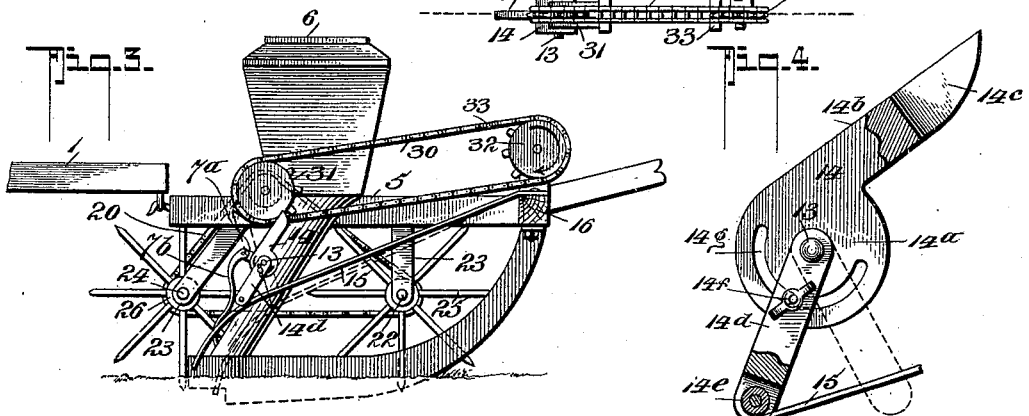
WITNESSES:
H. G. Dieterich
Harry L. Maush
INVENTOR
Wm. C. Meyer
BY
Fred G. Dieterich & Co.
ATTORNEYS

UNITED STATES PATENT OFFICE.

WILLIAM C. MEYER, OF EMMA, MISSOURI.

CORN-PLANTER ATTACHMENT.

SPECIFICATION forming part of Letters Patent No. 616,795, dated December 27, 1898.

Application filed October 6, 1898. Serial No. 692,834. (No model.)

*To all whom it may concern:*

Be it known that I, WILLIAM C. MEYER, residing at Emma, in the county of Saline, State of Missouri, have invented a new and Improved Corn-Planter Attachment, of which the following is a specification.

This invention is in the nature of an improved attachment for check-row corn-planters; and it has for its object to provide means for simultaneously operating the dropper devices and marking the row which can be easily applied to the ordinary form of check-row planters and dispense with the chain-operated check devices.

This invention also has for its object to provide a simple attachment for corn-planters which can be readily set to accurately operate the dropper devices, thrown into or out of operation from the driver's seat, and which is of a very simple and economical construction, easily manipulated, and which will effectively serve for its desired purposes.

Heretofore great difficulty has been found in the use of dropper devices operated without the check-wire in that the contact devices or wheels usually employed to operate the dropper mechanism, and which run on the ground, by reason of the least obstruction, such as a furrow or gutter, will serve to throw the dropper devices out of line on account of irregularity of their operation. This objection I endeavor to overcome by providing a duplex arrangement of ground-engaging wheels for operating the shaft which imparts motion to the seed-dropper mechanism and the marker devices, said duplex set of wheels being so arranged that one of the wheels will at all times be in contact with the ground, irrespective of the irregularity of the surface thereof.

The invention consists in certain planter attachments embodying the peculiar combination and novel arrangement of parts, such as will be first described in detail, and then specifically pointed out in the appended claims, reference being had to the accompanying drawings, in which—

Figure 1 is a perspective view of a cornplanter equipped with my improvements. Fig. 2 is a plan view thereof. Fig. 3 is a side elevation of the front end of the planter; and Fig. 4 is a detail view of the tripper-arm, hereinafter specifically referred to.

Referring to the drawings, 1 indicates the main frame, 2 the drive-axle, 3 the wheels thereon, 4 the driver's seat, 5 the front or runner frame, and 6 the seedboxes, all of which may be of the conventional or ordinary construction.

7 indicates the dropping-mechanism-operating shaft, which has suitable crank members, the short arms 7ª of which connect with the boot cut-off 7ᵇ, while the long arms 7ᶜ connect with the dropping mechanism, of any well-known construction, which is not shown, as it forms no part of this invention. The shaft 7 is held to rock in suitable bearings and provided at each end with a detachable cuff member 12, in which are fitted the laterally-extending shaft-sections 13, said sections being detachably held in the cuff members and having on their outer ends tripper-blocks 14, the peculiar construction of which will be presently more fully described.

15 indicates drags or markers, of which there is one on each side of the machine. These markers are secured at their front end on the lateral extensions of the front crossbar 16 and are either made of spring-metal plates the tension of which is such as to normally draw their free ends up from the ground, as shown in Fig. 3, or they may be provided with suitable means for keeping the said free ends normally elevated. The outer or free ends of the markers are bent down in line with the drop-tube and are adapted to be engaged by the tripper devices, as best shown in Fig. 1.

18 indicates a shaft journaled transversely on the dropper-frame, the ends thereof extending over the trippers. This shaft centrally has a drive sprocket-wheel 19, which receives motion from an endless chain 20, which passes over a chain-wheel 21 on a short shaft 22, held transversely on a supplemental frame 23, forming a part of the runner and disposed in advance of the shaft 18, said chain also passing over the chain-wheel 22ª, mounted on the transverse shaft 24, journaled in a subframe 23 at a point to the rear of the shaft 18.

The shaft carries a walking-wheel 25, while the shaft 24 carries a pair of walking-wheels 26, extended at each side of the longitudinal line of the walking-wheel 25. These wheels in practice are so arranged as to engage the ground in such manner that one of the wheels will at all times be in engagement with the ground, irrespective of the unevenness or furrow-like condition thereof. For example, should the front wheel be running in a furrow it is obvious that both the hind wheels 26 will be held in engagement with the ground at both sides the furrow. Should both the rear wheels be traveling in a pair of furrows, it is obvious that the center or front wheel will be held in engagement with the ground, thereby insuring a positive engagement of the chain for operating the shaft 18 during the entire travel of the machine across the field.

While I have shown three walking-wheels, it is obvious that a greater number may be employed, if desired, and while for the convenience of illustration I have shown the said wheels supported in a supplemental frame having pendent members it is obvious that the construction of the supports and the relative sizes of the wheels may vary as conditions may make desirable.

The trippers 14, one of which is illustrated in detail in Fig. 4, each consist of a disk portion $14^a$, fixedly held on the end of the shaft-section 13 and provided with an upwardly-extending tangential arm $14^b$, having a bifurcated end $14^c$, adapted to lap the lower strand of an endless chain 30, which passes over a chain-wheel 31 on the end of the shaft 18 and a chain-wheel 32, mounted on the end of the bar 16, said chain having one or more laterally-extending lugs 33, which at predetermined intervals engage the bifurcated end of the tripper-arm 14 and in consequence rocks the shaft 7 through the medium of the section 13 and the cuff member 12, and thereby sets in motion the dropper devices. Simultaneously with this operation the marker-bars 15 are depressed by reason of a pendent arm $14^d$, secured to and projecting downward from the disk 14 and having its lower end held in engagement with the said marker-bar, as clearly illustrated in the drawings, said lower end having a friction-roller $14^e$ to facilitate the operation of the parts. To regulate the extent of the pressure on the marker-bar, the arm $14^d$ is adjustably secured to the disk 14 and held to its adjusted positions by means of the set-screw $14^f$ and the concentric segmental slot $14^g$.

By providing a corn-planter with an attachment such as described it will be readily seen that as the shaft 18 receives motion through the walking-wheels movement will be imparted to the drive-chains 30 in the direction indicated by the arrow, and as the tripper members are in the path of both of the lugs or tappets on such chains it follows that as the said lugs or tappets engage the tripper members they will not only depress the markers, but at the same time operate shaft 7 and thus operate the dropper devices.

In the practical arrangement of my improvements the dropper and marker operating devices are extended at each side a distance equal to one-half the width of the machine, so the marker members 15 will mark from the center or draft line of the machine a distance equal the distance between the drive-wheels, such arrangement being provided that the markers 15 can be properly set to operate in line with the different marked rows as the machine travels in either direction.

Having thus described my invention, what I claim, and desire to secure by Letters Patent, is—

1. In an attachment for corn-planters; the combination with the dropping mechanism including the boot-slide-operating rock-shaft; a pair of markers fixedly secured at their front end to the dropper-frame, their free ends being normally held up from ground contact; tripper members fixedly secured to the ends of the boot-slide-operating rock-shaft, said members having one end in engagement with the free ends of the markers and their upper ends projected in line of operating mechanism set in motion by the movement of the planter-frame, substantially as shown and described.

2. In an attachment as described; the combination with the seed-dropping devices including a rock-shaft 7 and a drive-axle; of the detachable shaft-sections 13 having tripper members; the shafts carrying chain-wheels, one of such shafts being connected and driven by operating means, set in motion by the movement of the corn-planter; chains having tappets or lugs adapted to engage the aforesaid tripper members, and depressible markers having connection with the dropper members, all being arranged substantially as shown and described.

3. In a corn-planter attachment as described; the combination with the shaft 7, having extensible sections 13; the tripper members 14 secured on the ends of the shaft-sections 13, said members having bifurcated ends $14^a$; the spring-markers 15 secured at their front ends to the dropper-frame and having their free ends normally held elevated and engaging the lower ends of the trippers 14 and the endless tripper-operating chains geared with and driven from drive mechanism operated by the movement of the corn-planter, said chains passing between the bifurcated ends of the trippers 14 and having lugs or tappets, all being arranged substantially as shown and described.

4. As an improvement in corn-planters; the combination with the seed-dropper-operating rock-shaft and a marker normally held from engagement with the ground; of a tripper mechanism for imparting a rocking action to the seed-dropper rock-shaft at predetermined intervals, said tripper mechanism having engagement with the marker; and drive mechanism operated by the forward movement of the corn-planter, said drive mechanism having means for engaging the tripper at predetermined intervals and simultaneously operating the seed-dropper rock-shaft and the markers, substantially as shown and for the purposes described.

5. The combination with the seed-dropper rock-shaft 7, having extensions 13; the trippers fixedly secured on the ends of said rock-shaft and the markers 15 having their rear ends normally held elevated; of a driving-shaft 18; the supplemental transverse shafts carrying walking-wheels; an endless chain connecting the supplemental shafts and the drive-shaft 18; an endless chain carrying tappets geared with and operated by the drive-shaft 18 and having its tappets arranged to engage the tripper devices, all being arranged substantially as shown and described.

6. In a corn-planter attachment as described; the combination with the marker devices having their rear ends normally held elevated, and the tripper-operating chain; of a tripper fixedly held on the seed-dropper rock-shaft having a member held in line of the tripper-operating chains and having an adjustable pendent member to engage the markers, substantially as and for the purposes described.

WILLIAM C. MEYER.

Witnesses:
WM. EHLERS,
HY PINKEPANK.